(12) United States Patent
Shao et al.

(10) Patent No.: US 12,228,914 B2
(45) Date of Patent: Feb. 18, 2025

(54) INDUSTRIAL INTERNET OF THINGS WITH SENSOR NETWORK PLATFORM IN FRONT SUB PLATFORM TYPE AND CONTROL METHOD THEREOF

(71) Applicant: CHENGDU QINCHUAN IOT TECHNOLOGY CO., LTD., Sichuan (CN)

(72) Inventors: Zehua Shao, Chengdu (CN); Yong Li, Chengdu (CN); Bin Liu, Chengdu (CN); Yaqiang Quan, Chengdu (CN); Xiaojun Wei, Chengdu (CN)

(73) Assignee: CHENGDU QINCHUAN IOT TECHNOLOGY CO., LTD., Chengdu (CN)

( * ) Notice: Subject to any disclaimer, the term of this patent is extended or adjusted under 35 U.S.C. 154(b) by 424 days.

(21) Appl. No.: 17/807,733

(22) Filed: Jun. 20, 2022

(65) Prior Publication Data
US 2023/0409010 A1 Dec. 21, 2023

(51) Int. Cl.
*G05B 19/418* (2006.01)
*H04L 67/10* (2022.01)
(Continued)

(52) U.S. Cl.
CPC .......... *G05B 19/41835* (2013.01); *G05B 2219/31372* (2013.01); *H04L 2012/5632* (2013.01); *H04L 67/10* (2013.01); *H04W 4/38* (2018.02)

(58) Field of Classification Search
CPC .... G05B 19/41835; G05B 2219/31372; H04L 67/10; H04L 2012/5632; H04L 67/12; H04L 67/125; H04W 4/38; Y02P 90/02
See application file for complete search history.

(56) References Cited

U.S. PATENT DOCUMENTS

2018/0285234 A1* 10/2018 Degaonkar ......... G06F 11/0709
2019/0036841 A1* 1/2019 Nolan ..................... H04L 67/12
(Continued)

FOREIGN PATENT DOCUMENTS

| CN | 105045236 A | 11/2015 | |
|---|---|---|---|
| CN | 105629790 A * | 6/2016 | ............. G05B 19/04 |

(Continued)

OTHER PUBLICATIONS

Liang, CN-105629790-A English Machine Translation, 2016 (Year: 2016).*

(Continued)

*Primary Examiner* — Kenneth M Lo
*Assistant Examiner* — Jonathan Michael Skrzycki
(74) *Attorney, Agent, or Firm* — METIS IP LLC

(57) ABSTRACT

The present disclosure discloses an industrial Internet of things with a sensor network platform in a front sub platform type, comprising: a user platform, a service platform, a management platform, a sensor network platform, and an object platform which are interacted sequentially. The sensor network platform adopts front sub platform layout, which can process data for different target objects, and then summarize data, so as to reduce the data processing capacity of entire sensor network platform. The management platform is arranged independently to form multiple independent data processing channels of the same or different. The gateway on each communication network shares part of the calculation for the management platform, effectively reducing the calculation pressure of the management platform, and ensuring that the data is transmitted according to a specific path or processed by a specific server, so as to ensure the safety and independence of the data.

14 Claims, 5 Drawing Sheets

(51) Int. Cl.
*H04L 12/70* (2013.01)
*H04W 4/38* (2018.01)

(56) References Cited

U.S. PATENT DOCUMENTS

| | | | | |
|---|---|---|---|---|
| 2019/0273784 | A1* | 9/2019 | Shao | H04W 84/04 |
| 2020/0162572 | A1* | 5/2020 | Chu | H04L 67/10 |
| 2021/0092616 | A1* | 3/2021 | Desai | H04B 17/364 |
| 2022/0114011 | A1* | 4/2022 | Connor | G06F 9/5077 |
| 2022/0263820 | A1* | 8/2022 | Barton | H04L 63/0272 |

FOREIGN PATENT DOCUMENTS

| | | | | |
|---|---|---|---|---|
| CN | 105629790 B | | 2/2019 | |
| CN | 114820225 B | * | 9/2022 | G05B 19/406 |

OTHER PUBLICATIONS

Chen, CN-114820225-B English Machine Translation, 2022 (Year: 2022).*

Qiu, T. Edge Computing in Industrial Internet of Things: Architecture, Advances and Challenges; 2020, IEEE Explore, URL:<https://ieeexplore.ieee.org/document/9139976> (Year: 2020).*

Gambiroza, J. Big Data Challenges and Trade-offs in Energy Efficient Internet of Things systems; 2018, IEEE Explore, URL: <https://ieeexplore.ieee.org/document/8555770> (Year: 2018).*

Shashikala, N. "Secured Communication Strategies for Internet of Things Sensors", 2021, IEEE Xplore URL:<https://ieeexplore.ieee.org/abstract/document/9696487> (Year: 2021).*

Junliang, W. "A collaborative architecture of the industrial internet platform for manufacturing systems", 2020, Robotics and Computer Manufacturing, vol. 61, URL:<https://www.sciencedirect.com/science/article/pii/S073658451930242X> (Year: 2020).*

Shao, Zehua, Exploration and Research on the Structure of Internet of Things, Internet of Things Technologies Reliable Transmission, 2015, 10 pages.

Shao, Zehua, The Internet of Things sense the world beyond the world, China Renmin University Press, 2017, 30 pages.

Shao, Zehua, Smart City Architecture, Internet of Things Technologies Intelligent Processing and Application, 2016, 7 pages.

* cited by examiner

| The production line devices and the device data collectors of the object platform are divided into a plurality of target objects in different process sequences according to processes of manufacturing an assembly line product, and a device data collector of a same target object is used to collect real-time data of production line device of a corresponding process | S1 |

↓

| Each sub platform of the sensor network platform corresponds to target object data of each of different process sequences, the target object data includes threshold data of the production line device stored in each sub platform database and real-time data collected by the device data collector | S2 |

↓

| When the real-time data of the production line device is greater than threshold data, the sub platform corresponding to the production line device calls the target object data in the corresponding sub platform database, packages the data and transmits it to the general platform of the sensor network platform | S3 |

↓

| The general platform of the sensor network platform receives the packaged data, generates compiled files sorted by the process sequences according to the corresponding the production line devices and the device data collectors, classifies the compiled files according to the process sequences, and stores them in the second server | S4 |

↓

| The first server receives or retrieves the compiled files in corresponding sequences, analyzes the compiled files, and sends different control instructions to the corresponding second server based on analysis results | S5 |

↓

| The first server sorts and classifies the control instructions according to the process sequences of the object platform, and generates classified control instructions corresponding to the process sequences, the second server generates configuration files of different types corresponding to the process sequences according to the classified control instructions, and sends the configuration files to the general platform of the sensor network platform for summary and storage | S6 |

↓

| Each sub platform database of the sensor network platform corresponds to each information channel, the general platform of the sensor network platform sends the configuration files to the corresponding sub platforms, respectively, and the sub platforms control the corresponding production line devices and device data collectors to execute the corresponding control instructions according to the configuration files, respectively | S7 |

Predicting an amount of the monitoring data during the production of a production line device collected by a device data collector corresponding to a process — 310

Determining a broadband distribution scheme of the monitoring data transmitted by a corresponding sub platform of the sensor network platform based on predicted amount of the monitoring data — 320

FIG. 3

INDUSTRIAL INTERNET OF THINGS WITH SENSOR NETWORK PLATFORM IN FRONT SUB PLATFORM TYPE AND CONTROL METHOD THEREOF

TECHNICAL FIELD

The present disclosure generally relates to intelligent manufacturing technology, in particular, to industrial Internet of things with a sensor network platform in a front sub platform type and control method thereof.

BACKGROUND

In industry, the intelligent manufacturing of assembly line products by intelligent production is developing rapidly. The intelligent manufacturing of assembly line products involves multiple processes, device and auxiliary instruments. In order to facilitate intelligent control, it is often necessary to manage or control the use parameters, product manufacturing parameters and other data of some processes, device and auxiliary instruments. However, due to the large amount of such data, and the increased processes of the assembly line, the increase of the number of devices in different processes and other factors, the requirements for data processing, classification and transmission of a data control interaction center are too high, result in high computing pressure and high cost for the data control interaction center. At present, in the intelligent manufacturing process, it is not possible to achieve global intelligent control over the entire assembly line.

SUMMARY

The technical problem to be solved in the present disclosure is to provide an industrial Internet of things with a sensor network platform in a front sub platform type, which performs data classification, processing, coordination and unification by fitting process sequences of product manufacturing, makes full use of the information processing, transmission and storage capacity of different architectures by using different architectures of the Internet of things, and standardizes and classifies the corresponding information according to unified standards, reducing the level of information processing demand.

The present disclosure is realized by the following technical scheme: Industrial Internet of things with a sensor network platform in a front sub platform type, comprising: a user platform, a service platform, a management platform, a sensor network platform, and an object platform which are interacted sequentially, wherein the user platform is configured as a terminal device interacting with a user; the service platform is configured as a first server and configured to: receive an instruction of the user platform and send them to the management platform, and extract information required for the user platform from the management platform, processing the information, and send the information to the user platform; the management platform is configured as a second server and configured to control an operation of the object platform, and receive feedback data of the object platform; the sensor network platform is configured as a communication network and a gateway and configured to for interaction between the object platform and the management platform; the object platform is configured as production line devices and device data collectors for manufacture.

The service platform adopts centralized layout, the management platform adopts independent layout, and the sensor network platform adopts front sub platform layout; wherein the centralized layout means that the service platform uniformly receives data, uniformly processes data and uniformly sends data; the independent layout means that the management platform adopts different sub platforms for data storage, data processing and/or data transmission for different types of data;

the front sub platform layout means that the sensor network platform is provided with a general platform and a plurality of sub platforms, the plurality of sub platforms respectively store and process data of different types or data of different receiving objects sent by the object platform, and the general platform stores and processes data of the plurality of sub platforms after summarizing the data of the plurality of sub platforms, and transmits the data to the management platform; the production line devices and the device data collectors of the object platform are divided into a plurality of target objects in different process sequences according to processes of manufacturing an assembly line product, and a device data collector of a same target object is used to collect real-time data of production line device of a corresponding process; each sub platform of the sensor network platform corresponds to target object data of each of different process sequences, the target object data includes threshold data of a production line device stored in each sub platform database and real-time data collected by a device data collector, the sub platform database is configured in the gateway; when the real-time data of the production line device is greater than the threshold data, the sub platform corresponding to the production line device retrieves the target object data in the corresponding sub platform database, packages the data and transmits it to the general platform of the sensor network platform; the general platform of the sensor network platform receives the packaged data, generates compiled files sorted according to the process sequences based on the corresponding production line device and the device data collector, classifies the compiled files according to the process sequences, and stores them in the second server; the first server receives or retrieves the compiled files in corresponding sequences, analyzes the compiled files, and sends different control instructions to the corresponding second server based on analysis results; the first server sorts and classifies the control instructions according to the process sequences of the object platform, and generates classified control instructions corresponding to the process sequences, the second server generates configuration files of different types corresponding to the process sequences according to the classified control instructions, and sends the configuration files to the general platform of the sensor network platform for summary and storage; each sub platform database of the sensor network platform corresponds to each information channel, the general platform of the sensor network platform sends the configuration files to the corresponding sub platforms, respectively, and the sub platforms control the corresponding production line devices and device data collectors to execute the corresponding control instructions according to the configuration files, respectively.

Based on the above IOT technical scheme, when there are one or more sub processes in a same process, the production line devices and device data collectors corresponding to the one or more sub processes are divided into multiple sub target objects with different sub process sequences according to a sequence of manufacturing the assembly line product, sub target object data of each sub target object includes threshold data and real-time data corresponding to each sub target object, all sub target object data are sorted according to the sequence of manufacturing the assembly line product and then packaged and summarized, and used as target object data of the same process.

Based on the above IOT technical scheme, the threshold data of the production line device includes a fixed parameter value of a maximum threshold allowed by the corresponding production line device during product manufacturing, the real-time data is a real-time parameter value collected by the device data collector of the corresponding production line device according to predetermined time, and the real-time parameter value and the fixed parameter value belong to a same parameter type.

Based on the above IOT technical scheme, the threshold data of the production line device also includes an early warning parameter value corresponding to an early warning threshold set by the production line device during the product manufacturing, and the early warning parameter value is 70%~90% of the fixed parameter value.

Based on the above IOT technical scheme, when the real-time parameter value of each of the device data collector is greater than the early warning parameter value, the sub platform corresponding to the production line device also retrieves the target object data in the corresponding sub platform database and packages the data to the general platform of the sensor network platform; at this time, the target object data includes the early warning parameter value and the real-time parameter value.

Based on the above IOT technical scheme, when the real-time parameter value is greater than the early warning parameter value and the fixed parameter value, the sub platform corresponding to the production line device takes the corresponding fixed parameter value as priority data, and takes the fixed parameter value and the real-time parameter value as target object data in priority to package them to the general platform of the sensor network platform.

Based on the above IOT technical scheme, the general platform of the sensor network platform receives the packaged data, generates compiled files sorted by the process sequences according to the corresponding the production line device and the device data collectors, classifies the compiled files according to the process sequences, and stores them in the second server includes that: the general platform of the sensor network platform stores threshold data tables and real-time data tables sorted according to the process sequences in advance; the general platform of the sensor network platform receives the packaged data and compiles it according to the process sequences, and compiles the threshold data and the real-time data of all the same processes into the corresponding threshold data tables and real-time data tables to form sequential compiled files; the second server is arranged with a plurality of independent sub platform servers according to the process sequences, and the compiled files are stored through independent sub platform servers of the corresponding processes, respectively.

Based on the above IOT technical scheme, the first server receives or retrieves the compiled files in corresponding sequences and analyzes the compiled files, and sends different control instructions to the corresponding second server based on analysis results further includes that: the first server is preset with a real area map matching with installation environment of the production line devices, the production line devices in the real area map are named successively according to the process sequences of manufacturing the assembly line product, and each production line device has a parameter comparison table; the parameter comparison table at least comprises a standard data column and a comparison data column; after the first server receives or retrieves the compiled files in the corresponding sequences, the compiled files are divided into sections successively according to the process sequences, and the target object data in the compiled files corresponding to each section is mapped to the parameter comparison table of the production line device of the corresponding process, wherein the threshold data and the real-time data correspond to the standard data column and the comparison data column, respectively; when the real-time data exceeds the threshold data, the first server associates and identifies the corresponding production line device in the real area map; the first server sends the different control instructions to different identified production line device, packages all the different control instructions successively according to the process sequences, and then transmits them to the corresponding second server.

Based on the above IOT technical scheme, each production line device in the real area map is also configured with a control instruction table, the control instruction table stores a plurality of the control instructions and control instruction data packets associated with the control instructions, when the first server sends control instructions corresponding to different control instruction tables, the control instruction data packets of different control instructions are packaged successively according to the process sequences and transmitted to the corresponding second server.

Based on the above IOT technical scheme, in the compiled files, data segmentation characters are set between different processes, and the compiled files are segmented into node data through the data segmentation characters, the number of the node data is the same as the number of processes of manufacturing the assembly line product.

Compared with the prior art, the beneficial effects of the invention are as follows: the disclosure uses a five-platform structure to build the Internet of things, wherein the sensor network platform is arranged in a front sub platform, which can process data for different target objects, and then summarize data. A large amount of data can be processed first and then summarized, so as to reduce data processing capacity of the entire sensor network platform and avoid heavy load operation caused by data clutter. The management platform is arranged independently, forming multiple independent data processing channels of the same or different. Each data processing channel undertakes part of the calculation of the management platform, effectively reducing the computing pressure of the management platform, ensuring that the data is transmitted according to a specific path or processed by a specific server, and ensuring the safety and independence of the data. Finally, the service platform is arranged in a centralized manner to facilitate the collection of all data or the coordinated and unified processing of all target objects, so that the service platform can better control the Internet of things.

BRIEF DESCRIPTION OF THE DRAWINGS

This specification will be further described in the form of exemplary embodiments, which will be described in detail by the accompanying drawings. These embodiments are not restrictive. In these embodiments, the same number represents the same structure, wherein:

FIG. 2 shows a flow chart of the control method of the industrial Internet of things with a sensor network platform in a front sub platform type according to some embodiments in the present disclosure;

FIG. 3 shows an exemplary flowchart for determining a broadband allocation scheme according to some embodiments in the present disclosure;

DETAILED DESCRIPTION

In order to more clearly explain the technical scheme of the embodiments of the present disclosure, the following will briefly introduce the drawings that need to be used in the description of the embodiments. Obviously, the drawings in the following description are only some examples or embodiments of the present disclosure. For those skilled in the art, the present disclosure can also be applied to other similar scenarios according to these drawings without creative work. Unless it is obvious from the language environment or otherwise stated, the same label in the figure represents the same structure or operation.

It should be understood that the "system", "device", "unit" and/or "module" used herein is a method for distinguishing different components, elements, components, parts or assemblies at different levels. However, if other words serve the same purpose, they may be replaced by other expressions.

As used herein, the singular forms "a," "an," and "the" may be intended to include the plural forms as well, unless the context clearly indicates otherwise; and the plural forms may be intended to include the singular forms as well, unless the context clearly indicates otherwise. Generally speaking, the terms "include" and "comprise" only indicate that the steps and elements that have been clearly identified are included, and these steps and elements do not constitute an exclusive list. Methods or device may also contain other steps or elements.

A flowchart is used in the present disclosure to explain the operation performed by the system according to the embodiment of the present disclosure. It should be understood that the preceding or subsequent operations are not necessarily performed accurately in sequence. Instead, you can process the steps in reverse order or simultaneously. At the same time, you can add other operations to these procedures, or remove one or more operations from these procedures.

Figure 1:
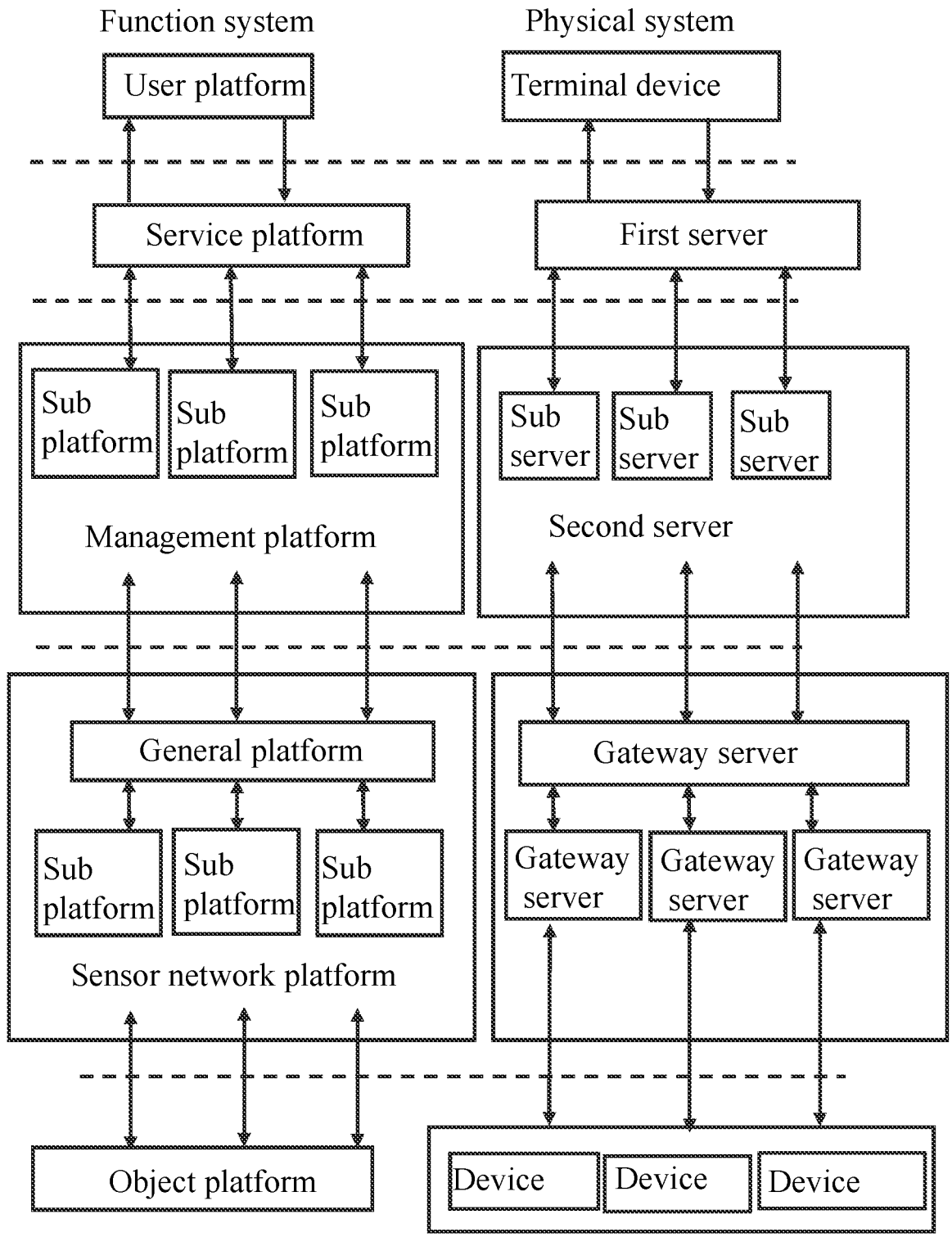
FIG. 1 shows a structural framework of the industrial Internet of things with a sensor network platform in a front sub platform type according to some embodiments in the present disclosure.

FIG. 1 shows a structural framework of the industrial Internet of things (IOT) with a sensor network platform in a front sub platform type according to some embodiments in the present disclosure.

As shown in FIG. 1, the Industrial IOT with a sensor network platform in a front sub platform type comprises: a user platform, a service platform, a management platform, a sensor network platform and an object platform which are interacted sequentially.

The user platform is configured as a terminal device interacting with a user. The service platform is configured as a first server and configured to: receive instructions of the user platform and send them to the management platform, and extract information required for processing the user platform from the management platform and send the information to the user platform. The management platform is configured as a second server, and configured to control an operation of the object platform, and receive feedback data of the object platform. The sensor network platform is configured as a communication network and a gateway and configured to perform interaction between the object platform and the management platform. The object platform is configured as production line devices and device data collectors for perform manufacture.

The service platform may adopt centralized layout, the management platform may adopt independent layout, and the sensor network platform may adopt front sub platform layout. The centralized layout may mean that the service platform uniformly receives data, uniformly processes data and uniformly sends data. The independent layout may mean that the management platform adopts different sub platforms for data storage, data processing and/or data transmission for different types of data. The front sub platform layout may mean that the sensor network platform is provided with a general platform and a plurality of sub platforms, the plurality of sub platforms respectively store and process data of different types or data of different receiving objects sent by the object platform, and the general platform stores and processes data of the plurality of sub platforms after summarizing the data of the plurality of sub platforms, and transmits the data to the management platform. The production line devices and the device data collectors of the object platform may be divided into a plurality of target objects in different process sequences according to processes of manufacturing an assembly line product, and a device data collector of a same target object may be used to collect real-time data of the production line device of a corresponding process. Each sub platform of the sensor network platform may respectively correspond to target object data of each of different process sequences, the target object data may include threshold data of the production line device stored in each sub platform database and the real-time data collected by the device data collector, the sub platform data database may be configured in the gateway. When the real-time data of the production line device is greater than the threshold data, the sub platform corresponding to the production line device may call the target object data in the corresponding sub platform database, package the data and transmit it to the general platform of the sensor network platform. The general platform of the sensor network platform may receive the packaged data, generate compiled files sorted by the process sequences according to the corresponding the production line devices and the device data collectors, classify the compiled files according to the process sequences and store them in the second server. The first server may receive or retrieve the compiled files in corresponding sequences and analyze the compiled files, and send different control instructions to the corresponding second server based on analysis results. The first server may sort and classify the control instructions according to the process sequences of the object platform, and generate classified control instructions corresponding to the process sequences, the second server may generate configuration files of different types corresponding to the process sequences according to the classified control instructions, and send the configuration files to the general platform of the sensor network platform for summary and storage. Each sub platform database of the sensor network platform may correspond to each information channel, the general platform of the sensor network platform may send the configuration files to the corresponding sub platforms, respectively, and the sub platforms may control the corresponding production line devices and device data collectors to execute the corresponding control instructions according to the configuration files, respectively.

In the existing technology, in the field of intelligent manufacturing technology, the products may be manufactured according to a process of an assembly line. As some electronic products and mechanical products involve the assembly of parts and components, they not only involve complex processes and devices, but also involve complex intelligent control. These may form huge, complex and different types of data information. In the existing technology, the complex operations in an assembly line are basically classified or managed by sections according to workshops, processes, device, etc., and it is impossible to completely and uniformly control the entire operations in an assembly line. To do this, not only expensive cost investment, large amount of information transmission and processing, but also high requirements for device intelligence are required. Moreover, different control parameters or working parameters brought by complex processes and various device are more cumbersome, and various data may have different communication modes, which is very difficult to implement.

In this embodiment, a five-platform structure is used to build the Internet of things. The sensor network platform adopts the front sub platform layout, which can process data for different target objects, and then summarize data. A large amount of data can be processed first and then summarized, so as to reduce the data processing capacity of the entire sensor network platform and avoid heavy load operation caused by data clutter. The management platform is arranged independently to form multiple independent data processing channels of the same or different. Each data processing channel undertakes part of the calculation of the management platform, effectively reducing the calculation pressure of the management platform, and ensuring that the data is transmitted according to a specific path or processed by a specific server, so as to ensure the safety and independence of the data. Finally, the service platform adopts centralized layout to facilitate the collection of all data or the coordinated and unified processing of all target objects, so that the service platform and/or the user platform can better control the Internet of things.

It should be noted that the user platform in this embodiment may be a desktop computer, tablet computer, notebook computer, mobile phone or other electronic devices that can realize data processing and data communication, and is not limited here. In specific applications, the first server and the second server may adopt a single server or a server cluster, and there are no too many restrictions here. It should be understood that the data processing process mentioned in this embodiment may be processed by the processor of the server, and the data stored in the server may be stored on the storage device of the server, such as the hard disk and other memories. In specific applications, the sensor network platform may adopt multiple groups of gateway servers or multiple groups of intelligent routers, which are not limited here. It should be understood that the data processing process mentioned in the embodiment may be processed by the processor of the gateway server, and the data stored in the gateway server may be stored on the storage device of the gateway server, such as hard disk, SSD and other memories.

Further description, in this embodiment, the sensor network platform adopts the front sub platform layout, that is, it receives and processes the relevant data of the production line device and device data collector of the same process through multiple sub platforms, and then uses the general platform to process and summarize all the data according to the process sequences, so as to sort all the data according to the product process, which not only achieves orderly data processing, but also ensure that the data of different processes are independent and unaffected. Each sub platform and the general platform can share the data processing capacity with each other, thus reducing the computing pressure of the Internet of things. At the same time, when interacting with the management platform, data transmission and processing may be performed independently through multiple independent second servers according to the process, so as to achieve classification management and monitoring, and the data source is clear, which is also convenient for data processing, classification and management.

In some embodiments, the production line device may include/be all kinds of production line devices supported by the assembly line for product manufacturing. Taking mechanical products as an example, the production line device may be a component assembly device, an assembly device, a detection device, etc. Furthermore, taking an automobile engine assembly line as an example, the production line device may be cylinder processing device, cylinder positioning and turnover device, cam assembly installation device, bolt assembly installation equipment, machine filter assembly, oiling device, etc. Accordingly, the threshold data of the production line device may be a fixed parameter value corresponding to the maximum threshold value allowed by the production line device during product manufacturing, such as the maximum temperature value, air pressure value, oil pressure value, load amount, production amount per unit time, vibration amount, etc. When parameters of the production line device exceed the threshold value, it may indicate that the device is in abnormal or even in dangerous working state, thus, corresponding operations may be made through monitoring the data.

In some embodiments, the real-time data may be the real-time parameter value collected by the device data collector corresponding to the production line device according to the given time. The device data collectors may be divided into many types according to the different real-time data collected, such as a temperature sensor for collecting temperature, a pressure sensor for collecting pressure, a weight sensor for collecting weight, a counter for calculating the product quantity, a vibration sensor for collecting vibration frequency, etc. Correspondingly, the real-time parameter value is the real-time data of the production line device collected by the corresponding device data collector, for example, it may actually be/include temperature value, pressure value, product load amount value, production amount per unit time, device vibration frequency, etc. In specific application, the real-time parameter value and the fixed parameter value belong to the same parameter type, convenient for comparing the parameters of a certain production line device, so as to monitor the device working conditions, protect the device and product manufacturing, or collect more real-time parameters associated with the production line device, so as to have a more comprehensive understanding of the production line device working conditions.

When the real-time data of the production line device is greater than the threshold data, it means that the real-time parameters corresponding to the production line device may exceed the set working state of the production line device, which may lead to a production line device failure, dangerous operation, overload operation, etc. At this time, the sensor network platform may compare the real-time data with the threshold data, and the general platform may generate the compiled files sorted according to the process sequences corresponding to the real-time data and upload it, thus, the first server may issue control instructions to perform corresponding operations on the production line device and/or device data collector (such as controlling the production line device to reduce the temperature and pressure, reducing the working speed, reducing the product feed, and sending out alarm alarms, etc.), so as to carry out intelligent device control and reduce production risks.

In specific applications, there may be several sub processes formed through several production line device in one process, all sub processes together form a large process. For example, in an automobile distribution assembly line, when installing a cam, there may be eight sub processes in total, which specifically include loosening the bearing cap, removing the bearing cap, installing the upper and lower bearing pads, installing the piston cooling nozzle, inserting the camshaft driving key, installing the camshaft thrust plate, lifting the crankshaft, and driving the key. Based on this, when there are several sub processes in the same process, the production line device and device data collectors corresponding to several sub processes may be divided into multiple sub target objects with different sub process sequences according to sequences of manufacturing an assembly line product. The threshold data and real-time data corresponding to each sub target object may be sub target object data of the corresponding sub target object, all sub target object data may be sorted according to the product manufacturing sequences and then packaged and summarized as target object data of the operation.

In the specific application, the threshold data of the production line device may also include an early warning parameter value corresponding to a warning threshold set by the production line device during product manufacturing, and the warning parameter value may be 70%~90% of the fixed parameter value. When the real-time parameter value of the device data collector is greater than the early warning parameter value, the sub platform corresponding to the production line device may also retrieve the target object data in the corresponding sub platform database and package the data to the general platform of the sensor network platform. At this time, the target object data may include the early warning parameter value and the real-time parameter value. There may be data delay during the collection and transmission of the real-time data of the production line device. During this period when such data is finally feed back to the management platform and the service platform, corresponding operations may be carried out through control instructions feedback by the service platform, a process time may be required. If any platform is delayed or the feedback is too slow, a best processing time may be missed, resulting in corresponding accidents of the production line device. Therefore, the present disclosure also sets the corresponding early-warning parameter value on the production line device or the sub platform of the production line device, which is less than the fixed parameter value. Therefore, when the real-time parameter value is greater than the early-warning parameter value, the sub platform corresponding to the production line device may also retrieve the target object data in the corresponding sub platform database and package the target object data to the general platform of the sensor network platform. Thus, the management platform can know the device parameters in advance, give early warning, perform corresponding early warning operations, and issue control commands, so as to solve many problems caused by data delay.

Further, in the case that there are early warning parameter value and fixed parameter value at the same time, when the real-time parameter value is greater than the early warning parameter value and fixed parameter value, the sub platform corresponding to the production line device may take the corresponding fixed parameter value as priority data, and take the fixed parameter value and real-time parameter value as target object data to package them to the general platform of the sensor network platform. During the production process of the production line device, a parameter may change rapidly in one time period, so it may exceed the early warning parameter value and the fixed parameter value at the same time or time period. At this time, the device is in urgent need of corresponding operations. Therefore, we take the fixed parameter value as the priority data, and give priority to packaging the fixed parameter value and the real-time parameter value as the target object data to the general platform of the sensor network platform. Thus, the corresponding platform or platform operators can determine the latest status of the device and give the fastest treatment to protect the device when obtaining the target object data.

In specific application, in order to facilitate processing, classification and interpretation of data, that the general platform of the sensor network platform may receive packaged data, generate compiled files sorted by the process sequences according to the corresponding production line device and the device data collectors, classify the compiled files according to the process sequences, and store them in the second server specifically include the following: the general platform of the sensor network platform may store threshold data tables and real-time data tables sorted according to the process sequences in advance; the general platform of the sensor network platform may receive the packaged data and compile it according to the process sequences, and compile the threshold data and the real-time data of all the same processes into the corresponding threshold data tables and real-time data tables to form sequential compiled files; the second server may be arranged with a plurality of independent sub platform servers according to the process sequences, and the compiled files may be stored through independent sub platform servers of the corresponding processes, respectively. The threshold data tables and the real-time data tables may be sorted according to the process sequences, each of which correspond to the data of the production line device and the device data collectors in each process, so that the data can be independent and easy to be processed whether in data processing, transmission or data interaction.

In specific applications, in order to further reduce the amount of data analysis, reduce number of data conversion and facilitate data interaction, that the first server may receive or retrieve the compiled files in corresponding sequences, analyze the compiled files, and send different control instructions to the corresponding second server based on analysis results specifically include the following: the first server may be preset with a real area map matching with installation environment of the production line devices, the production line devices may be named successively according to process sequences of assembly line product manufacturing in the real area map, and each production line device may be equipped with a parameter comparison table; the parameter comparison table may at least comprise a standard data column and a comparison data column; after the first server receives or retrieves the compiled files in the corresponding sequence, the compiled files may be divided into sections successively according to the process sequences, and the target object data in the compiled files corresponding to each section may be mapped to the parameter comparison table of the production line device of the corresponding process, wherein the threshold data and the real-time data may correspond to the standard data column and the comparison data column respectively; when the real-time data exceeds the threshold data, the first server may associate and identify the corresponding production line device in the real area map; the first server may send the different control instructions to different production line device after identification, package all the different control instructions in sequence according to the process sequences, and then transmit them to the corresponding second server.

Based on this, when the first server performs corresponding operation or control, it can view and compare the corresponding device of the corresponding process in the real area map, and view the corresponding data in the parameter comparison table through mapped data, so as to conduct intuitive operation and identification. In addition, the real area map and the parameter comparison table can be also directly used as data source to interact with the user platform, which is also convenient for the user platform to view and operate the corresponding data.

It should be noted that, the first server may associate and identify the corresponding production line device in the real area map, which refers to that: when the real-time data of the production line device exceeds the threshold data, the corresponding production line device may have different identification effects from other normal production line devices in the real area map. For example, the parameters of the normal production line device may be unified into colorless identification, while the production line device whose real-time data exceeds the threshold data may be identified by other colors, such as red, orange, etc. In addition, color flicker may be used for further distinction. During identification, difference between the instant data and the threshold data may also be identified according to different colors. For example, the difference between the instant data and the threshold data may be distinguished from small to large identified by light yellow, yellow, orange, light red, red, dark red, etc. Therefore, the difference between the instant data and the threshold data may also be identified according to the color to reflect a size of corresponding data of the production line device, then hazard level of the production line device may be obtained in reverse.

Immediately above, in order to facilitate information exchange and speed up information feedback, each production line device in the real area map may be also configured with a control instruction table, the control instruction table stores a plurality of the control instructions and control instruction data packets associated with the control instructions, when the first server sends corresponding control instructions corresponding to different control instruction tables, the control instruction data packets of different control instructions may be packaged successively according to the process sequences and transmitted to the corresponding second server.

Further, in the compiled files, data segmentation characters may be set between different processes, and the compiled files may be segmented into same number of node data as the number of the assembly line product manufacturing process through the data segmentation characters. Thus, when packaging, summarizing and decomposing in different processes, the data segmentation characters may be referred to operate, which may save data processing speed compared with identifying huge data nodes.

FIG. 2 shows a flow chart of the control method of the industrial Internet of things with a sensor network platform in a front sub platform type according to some embodiments in the present disclosure.

As shown in FIG. 2, the second embodiment of the present disclosure aims to provide a control method of industrial Internet of things with a sensor network platform in a front sub platform type, the industrial Internet of things with the sensor network platform in the front sub platform type includes: a user platform, a service platform, a management platform, a sensor network platform, and an object platform which are interacted sequentially.

The user platform is configured as a terminal device interacting with a user. The service platform is configured as a first server and configured to: receive instructions of the user platform and send them to the management platform, and extract information required for the user platform from the management platform, process the information, and send the information to the user platform. The management platform is configured as a second server, and configured to control an operation of the object platform, and receive feedback data of the object platform. The sensor network platform is configured as a communication network and a gateway and configured to perform interaction between the object platform and the management platform. The object platform is configured as production line devices and device data collectors for perform manufacture.

The service platform may adopt centralized layout, the management platform may adopt independent layout, and the sensor network platform may adopt front sub platform layout. The centralized layout may mean that the service platform uniformly receives data, uniformly processes data and uniformly sends data. The independent layout may mean that the management platform adopts different sub platforms for data storage, data processing and/or data transmission for different types of data. The front sub platform layout may mean that the sensor network platform is provided with a general platform and a plurality of sub platforms, the plurality of sub platforms respectively store and process data of different types or data of different receiving objects sent by the object platform, and the general platform stores and processes data of the plurality of sub platforms after summarizing the data of the plurality of sub platforms, and transmits the data to the management platform.

The control method comprises the following steps. The production line device and the device data collectors of the object platform may be divided into a plurality of target objects in different process sequences according to processes of manufacturing an assembly line product, and a device data collector of a same target object may be used to collect real-time data of the production line device of a corresponding process. Each sub platform of the sensor network platform may respectively correspond to target object data of different process sequences, the target object data may include threshold data of the production line device stored in each sub platform database and the real-time data collected by the device data collector, the sub platform data database may be configured in the gateway. When the real-time data of the production line device is greater than the threshold data, the sub platform corresponding to the production line device may call the target object data in the corresponding sub platform database, package the data and transmit it to the general platform of the sensor network platform. The general platform of the sensor network platform may receive the packaged data, generate compiled files sorted by the process sequences according to the corresponding the production line device and the device data collectors, classify the compiled files according to the process sequences and store them in the second server. The first server may receive or retrieve the compiled files in corresponding sequences and analyze the compiled files, and send different control instructions to the corresponding second server based on analysis results. The first server may sort and classify the control instructions according to the process sequences of the object platform, and generate classified control instructions corresponding to the process sequences, the second server may generate configuration files of different types corresponding to the process sequences according to the classified control instructions, and send the configuration files to the general platform of the sensor network platform for summary and storage. Each sub platform database of the sensor network platform may correspond to each information channel, the general platform of the sensor network platform may send the configuration files to the corresponding sub platforms, respectively, and the sub platforms may control the corresponding production line device and device data collectors to execute the corresponding control instructions according to the configuration files, respectively.

FIG. 3 shows an exemplary flowchart for a process of determining a broadband allocation scheme according to some embodiments in the present disclosure. As shown in FIG. 3, process 300 contains the following steps. In some embodiments, process 300 may be performed by the sensor network platform.

In some embodiments, each platform included in the industrial Internet of things with a sensor network platform in a front sub platform type may be applicable to the scene of automobile engine assembly and production. For example, the object platform may be configured with multiple production line devices and multiple device data collectors, where, the production line devices may include cylinder processing devices, cylinder positioning and turnover devices, cam assembly installation devices, bolt assembly installation devices, machine filter assembly, oiling devices, etc. The device data collectors may include various types of sensors (e.g., thermometers, barometers, etc.) and may also include image and/or video data acquisition devices (e.g., video monitors, etc.). The sensor network platform may be configured as a communication network and a gateway. Each sub platform of the sensor network platform may configure a gateway according to the target object data of different process sequences. The target object data may include a data volume threshold of each production line device and data uploaded by the device data collectors (such as the monitoring data).

In some embodiments, the processes of manufacturing an assembly line product corresponding to the object platform may include various processes of the automobile engine assembly and production. For example, the automobile production process may include 22 process flows, for example, 1. the cylinder block is facing down, the cylinder block, crankshaft and camshaft are fed, cleaned, blown, and the diesel engine model and label are printed; 2. after the cylinder block is turned 180°, mark it for confirmation; 3. after the cylinder block is turned over, the ground of the cylinder block is upward, etc.

In some embodiments, the production line devices and the device data collectors of the object platform may be divided into a plurality of target objects with different process sequences according to the process of assembly line of automobile production and assembly, and a device data collector of the same target object may collect the real-time data of the production line device(s) of the corresponding process. For example, in a first process of the automobile production process, the video monitor of the corresponding process may obtain video data of an operator during execution of the process.

In some embodiments, the control method of industrial Internet of things with a sensor network platform in a front sub platform type further includes: predicting an amount of the monitoring data during the production of a production line device collected by a device data collector corresponding to the process; and determining a broadband distribution scheme of the monitoring data transmitted by a corresponding sub platform of the sensor network platform based on predicted amount of the monitoring data.

In step 310, predicting an amount of the monitoring data during the production of a production line device collected by a device data collector corresponding to a process.

In some embodiments, the target object data for a process may include monitoring data for that process. The monitoring data may refer to image and/or video data about the process obtained by a video monitor (such as a camera). For example, in the first process of an automobile production and assembly line, working images of the process may be collected by one or more cameras corresponding to the first process.

The amount of the monitoring data may refer to an amount of data contained in the monitoring data. In some embodiments, the longer the video of the monitoring data, the larger the amount of the corresponding monitoring data.

In some embodiments, based on relevant contents of the process, the amount of monitoring data of the corresponding process may be predicted.

In some embodiments, the amount of the monitoring data may be predicted based on proficiency of an operator of the production line device corresponding to the process, relevant parameters of the process and shooting parameters of the process.

The operator proficiency (or proficiency of the operator) refers to proficiency of production personnel of the corresponding process in operations of the production process. In some embodiments, the operator proficiency may be determined by working time of the production personnel in the corresponding production process. For example, the longer an operator works, the higher his proficiency may be considered.

The relevant parameters of the process may refer to parameters related to production characteristics of the process. In some embodiments, the relevant parameters of the process may include production type of the process and recheck proportion of the production process.

The production type of the process refers to an operation type completed by the operators when executing the corresponding process. For example, the production type of the process may include any combination of one or more of installation type, inspection record type, measurement type, etc.

The recheck proportion of the production process refers to recheck of some parameters of the products of the completed process after the production process of the process is completed. In some embodiments, a part whose parameters are to be rechecked may be a part with high quality requirements in the process. For example, after process of hoisting a cylinder head is completed, it may be necessary to recheck parameters such as a clearance width between the cylinder head and the cylinder body, an overall tightness. In some embodiments, the recheck proportion may be set by administrators.

The shooting parameters of the process refer to relevant parameters captured by video monitors corresponding to the process. In some embodiments, the shooting parameters of the process may include shooting angles of the corresponding video monitors and fineness of the video images (pictures). The shooting angles may ensure that lens can obtain pictures of the whole operation flow of the corresponding process. The fineness of the video pictures may be determined by adjusting focal lengths and picture definition of the video monitors.

In some embodiments, the amount of the monitoring data may be calculated and predicted by the weight proportion of the above parameters based on the operator proficiency of the production line device corresponding to the process, the relevant parameters of the process and the shooting parameters of the process.

In some embodiments, the amount of the monitoring data may be predicted by a data amount prediction model, the data amount prediction model may be a multi classification model. In some embodiments, the data amount prediction model may be a machine learning model, including any one or a combination of a deep neural network model, a recurrent neural network model, a convolutional neural network, or other customized model structures.

In some embodiments, the input of the data amount prediction model may include the operator proficiency of the production line device corresponding to the process, the relevant parameters of the process and the shooting parameters of the process. The output of the data amount prediction model may be a data group containing a plurality of probability values, such as a probability vector composed of a plurality of probability values. The probability vector can reflect a probability that a predicted amount of monitoring data belongs to a range of an amount of monitoring data corresponding to each tag. A label can correspond to a range of an amount of the monitoring data. The value of the range of the monitoring data and the starting range may be set freely. For example, tag 1 may indicate 100-90 Mb, tag 2 may indicate 90-80 Mb, tag 3 may indicate 80-70 Mb, etc. The output of the data amount prediction model may include the probability values corresponding to each tag. For example, the output of the data volume prediction model may be (0.1, 0.2, 0.7), where 0.1 means that the probability that the predicted value belongs to the range corresponding to label 1 is 10%, 0.2 means that the probability that the predicted value belongs to the range corresponding to label 2 is 20%, and 0.7 means that the probability that the predicted value belongs to the range corresponding to label 3 is 70%.

In some embodiments, the data amount prediction model may be acquired based on training. The training of the data amount prediction model may be performed by the general platform of the sensor network.

In some embodiments, when training the data amount prediction model, a plurality of labeled training samples may be used for training through a variety of methods (e.g., gradient descent method), so that parameters of the data amount prediction model may be learned. When the trained data amount prediction model meets preset conditions, the training ends, and the trained data amount prediction model is obtained.

The training samples may include the operator proficiency of the production line devices corresponding to historical processes, relevant parameters of the historical processes and shooting parameters of the historical processes. Labels of the training samples may be the amount of historical monitoring data, such as 98, 85, 72, etc., and the labels of the training samples may be obtained through manual labeling. In some embodiments, the data amount prediction model may be trained in another device or module.

In step 320, determining a broadband distribution scheme of the monitoring data transmitted by a corresponding sub platform of the sensor network platform based on the predicted amount of the monitoring data.

The broadband distribution scheme refers to the situation that different broadband sizes are allocated to sub platforms of the sensor network platform. A sensor network sub platform may correspond to a process with complex operation types or long operation time, and a large bandwidth needs to be allocated to the sensor network sub platform. For example, generally speaking, an installation process is more complex and takes longer than an inspection record process, and the broadband allocated to the sensor network sub platform corresponding to the installation process may be larger.

In some embodiments, the broadband distribution scheme for the monitoring data transmitted by a corresponding sub platform of the sensor network platform may be determined by setting complexity and time length of the process operation. For example, the complexity of the process operation may be rated from 1 to 10. The higher the complexity, the greater the number, and the larger the corresponding distributed broadband. For example, the broadband distributed to (by) the sub platform of the sensor network platform for the process with complexity of 5 may be 20 MHz; the broadband distributed to the sensor network sub platform corresponding to the process with a complexity of 8 may be 32 MHz. For another example, broadband traffic may be distributed based on the time length of the process operation. For example, the broadband distributed to the process corresponding to a time length of 30 minute may be 15 MHz; the broadband distributed to the process corresponding to a time length of one hour may be 30 MHz.

In some embodiments of the present disclosure, the amount of monitoring data may be predicted through the machine learning model, and based on the predicted amount of the monitoring data, the broadband distribution scheme for the monitoring data of the corresponding sub platform of the sensor network platform may be determined, so that the data situation can be predicted in advance to prevent the slow transmission speed and untimely data acquisition caused by the large amount of data.

It should be noted that the above description of process 300 is only for example and explanation, and does not limit the scope of application of the present disclosure. For those skilled in the art, various modifications and changes can be made to process 300 under the guidance of the present disclosure. However, these amendments and changes are still within the scope of the present disclosure.

Figure 4:
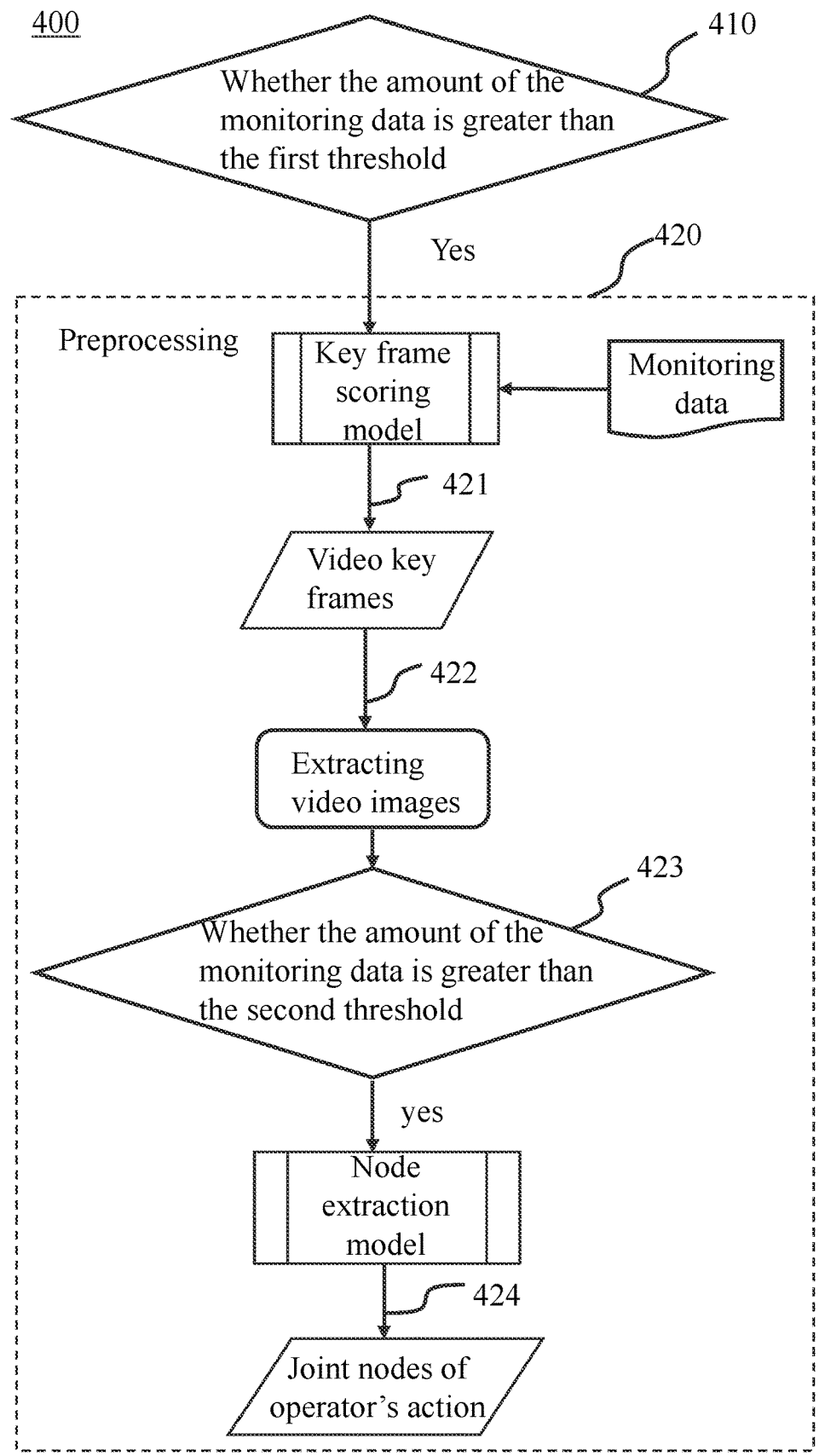
FIG. 4 shows an exemplary flowchart for preprocessing monitoring data according to some embodiments in the present disclosure.

FIG. 4 shows an exemplary flowchart for preprocessing monitoring data according to some embodiments in the present disclosure. As shown in FIG. 4, process 400 includes the following steps. In some embodiments, process 400 may be performed by the general platform of the sensor network.

In step 410, determining whether the amount of the monitoring data is greater than a first threshold.

The first threshold may be a maximum amount of monitoring data which is transmissible with broadband distributed by the sub platform of the sensor network platform of the corresponding process.

In some embodiments, each broadband distributed by each sub platform of the sensor network platform is different, and each first threshold corresponding to each sub platform may be different. In some embodiments, the first threshold may be freely set by administrators.

In some embodiments, the amount of monitoring data transmissible with the broadband of the sub platform of the sensor network platform may be the maximum amount of the monitoring data recorded under the condition that operators of the corresponding process operate normally. When the operators make mistakes, the whole operation flow may become longer, and the amount of the monitoring data recorded may also become larger, thus the amount of the monitoring data may exceed the first threshold.

In step 420, preprocessing the monitoring data before transmitting the monitoring data in response to the amount of the monitoring data being greater than the first threshold.

In some embodiments, in response to the amount of the monitoring data being greater than the first threshold, the general platform of the sensor network may preprocess the monitoring data before transmitting the monitoring data. Preprocess refers to processing the corresponding monitoring data to reduce the amount of the monitoring data. The preprocess steps are as follows:

In step 421, determining video key frames of the monitoring data.

Video key frames refer to frames in a monitoring video that includes key actions of the production line device operation or the operators in the operation process. Among them, key actions may be first actions for operators to start the operation, or the most important actions in the operation process. For example, a key action may include an alignment of the cylinder head and the cylinder body by the production device, placement of the cylinder head, and other important actions.

In some embodiments, each frame image of the video of the monitoring data may be scored based on a key frame scoring model; images of the video whose scores are greater than a threshold may be determined as the video key frames.

In some embodiments, the key frame scoring model may be a machine learning model, including any one or combination of a deep neural network model, a recurrent neural network model, a convolutional neural network, or other customized model structures.

In some embodiments, the key frame scoring model may include a feature extraction layer and a scoring layer. The feature extraction layer can be used to extract features of key actions in the images, and the scoring layer can score each frame of the images based on features of the images. In some embodiments, an output of the feature extraction layer may be used as an input of the scoring layer. An input of the feature extraction layer may be monitoring video images, and the output of the feature extraction layer may be a feature vector of each video image frame. The input of the scoring layer may be the feature vector of each video image frame, and the output of the scoring layer may be a score of each video image frame.

In some embodiments, the key frame scoring model may be acquired based on training. Training of the key frame scoring model may be performed by the general platform of the sensor network.

In some embodiments, when the key frame scoring model is trained, a plurality of labeled training samples may be used, wherein the feature extraction layer and the scoring layer may be jointly trained. Specifically, the labeled training samples may be input into an initial feature extraction layer, parameters of the initial feature extraction layer and an initial scoring layer are updated through training until a trained intermediate feature extraction layer and a trained intermediate scoring layer meet the preset conditions to obtain the trained feature extraction layer and the trained scoring layer so as to learn parameters of the key frame scoring model. When the key frame scoring model training meets preset conditions, the training may end, the trained key frame scoring model may be obtained.

In some embodiments, in the training of the key frame scoring model, a score of a start frame with a key operation may be marked as 1, and image similarities between other frames and the start frame may be used as labels of other frames. The similarities may be denoted as any value between [0,1], the larger the values, the higher the similarities. In some embodiments, the similarities may be determined based on an algorithm. For example, images of the key frames may be converted into a vector representation, the Euclidean distances or Manhattan distances between other frames and the key frame may be calculated, and the similarities may be further calculated according to the distance results.

In step 422, extracting video images based on a specific range before and after the video key frames.

Generally speaking, the monitoring video may include the whole operation procedure of the corresponding process, including empty lenses excluding operator operations and the production line device operation. In some embodiments, the video images may be extracted based on the specific range before and after the video key frames, and the extracted video images may only include all actions of the production line device operation or the operator operations.

Some embodiments of the present disclosure extract video images in the specific range through the key frames of the video (or video key frames), which can reduce unnecessary content in the monitoring data, reduce the transportation pressure of the broadband, and facilitate managers to quickly obtain useful monitoring data content.

In step 423, determining whether the amount of the monitoring data is greater than second threshold.

The second threshold may be a value that exceeds the maximum amount of monitoring data transmissible with the broadband distributed by the sub platform of the sensor network platform. In some embodiments, the second threshold may be greater than the first threshold.

In step 424, in response to the amount of the monitoring data greater than the second threshold, based on a node extraction model, extracting joint nodes of the operator (or the operator's action, the operation in action) from non key frame images before and after the key frames to replace image data to be uploaded.

In some embodiments, when the amount of monitoring data is greater than the second threshold, based on a node extraction model, extracting joint nodes of the operator from non key frame images before and after the key frames to replace image data and uploading.

In some embodiments, the non key frame images before and after the key frames may be video images including non key frame portion of the extracted video images determined based on step 422.

In some embodiments, the node extraction model may be a machine learning model, including any one or combination of a deep neural network model, a recurrent neural network model, a convolutional neural network, or other customized model structures.

In some embodiments, inputs of the node extraction model may include non key frame images, and outputs of the node extraction model may be joint nodes of the operators in the images.

In some embodiments, the node extraction model may be acquired based on training. The training of the node extraction model may be performed by the general platform of the sensor network.

In some embodiments, when training the node extraction model, a plurality of labeled training samples may be used for training through a variety of methods (e. g., gradient descent method), so that the parameters of the model may be learned. When the training model meets the preset conditions, the training may end and the trained node extraction model may be obtained.

The training samples may include historical monitoring videos, and labels of the training samples may be joint nodes of the operators in the historical monitoring videos, such as elbow joint, wrist joint, cervical vertebra, etc. The labels of training samples may be obtained by manual annotation. In some embodiments, the node extraction model may be trained in another device or module.

In some embodiments, the general platform of the sensor network may also adjust a preset sampling rate in real time based on similarities between the key frame and other frame images adjacent to the key frame. The sampling rate may be a ratio of a number of uploaded frames to a total number of monitoring video frames.

In some embodiments, the similarities may be determined by converting each frame image in the video into a vector representation and calculating distances between the key frame and other adjacent frames thereto. In some embodiments, the higher a similarity, the smaller the adjustment of the corresponding sampling rate.

In some embodiments, the adjustment of the sampling rate may be determined by a functional relationship between the sampling rate and the similarity. As shown in formula (1):

$$\alpha = g(1-f) + h \qquad (1)$$

where $\alpha$ denotes the preset sampling rate, f denotes the similarity, g and h denotes constants.

Figure 5:
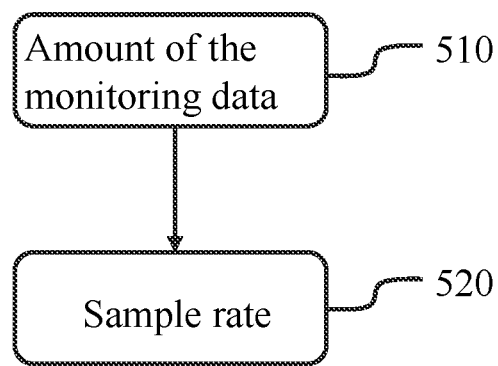
FIG. 5 shows an exemplary flowchart for determining a sampling rate of the monitoring data according to some embodiments in the present disclosure.

For more information on the sample rate adjustment, see FIG. 5 and its detailed description.

Some embodiments of the present disclosure can reduce the amount of data of the monitoring video, reduce the uploading of useless information, and reduce the pressure of broadband for data transmission by replacing the image data with joint node information of the operators.

FIG. 5 shows an exemplary flowchart for determining a sampling rate of monitoring data according to some embodiments in the present disclosure.

In some embodiments, the sampling rate 520 of the monitoring data may be determined based on the predicted amount of the monitoring data 510.

In some embodiments, the predicted amount of the monitoring data 510 may be negatively correlated with the sampling rate 520, and the larger the predicted amount of the monitoring data, the lower the sampling rate. In some embodiments, an adjustment multiple of the sampling rate 520 may be determined based on a mathematical relationship between the sampling rate 520 and the amount of the monitoring data 510.

In some embodiments, the adjustment multiple of the sampling rate 520 may be determined by setting a threshold value of the amount of the monitoring data 510. For example, the threshold of the amount of the monitoring data may include a first threshold, a second threshold, a third threshold . . . . When the predicted amount of the monitoring data exceeds the first threshold and is less than the second threshold, the sampling rate may be adjusted to 0.75 times the preset sampling rate; when the predicted amount of the monitoring data exceeds the second threshold and is less than the third threshold, the sampling rate may be adjusted to 0.5 times the preset sampling rate, and so on.

In some embodiments, the adjustment multiple of the sampling rate may also be determined based on functional relationship between the sampling rate 520 and the amount of the monitoring data 510. As shown in formula (2):

$$j = [c/(p+d)] + e \qquad (2),$$

where, j represents the adjustment multiple of the sampling rate, p is the amount of monitoring data, and c, d, e denote constants.

In some embodiments, an adjustment amplitude of the sampling rate 520 may be determined based on confidence degrees of output results of the data amount prediction model.

In some embodiments, the confidence degrees may be probability values that the predicted amount of monitoring data output based on the data amount prediction model falls within a range interval of each amount of monitoring data. For example, based on the data amount prediction model described in step 310, the output of the data amount prediction model may be (0.1, 0.2, 0.7), where each probability value corresponding to each interval may be expressed as the confidence degree corresponding to the range interval of the amount of monitoring data. In some embodiments, the adjustment amplitude (or adjustment range) of the sampling rate may be determined based on a greatest range interval of the confidence degrees. For example, the maximum confidence degree (or coefficient) may be 0.7, and the corresponding interval of the amount of the monitoring data may be 80-70 Mb. In some embodiments, the smaller the range interval of the amount of monitoring data corresponding to the confidence coefficient, the smaller the adjustment amplitude of the sampling rate.

In some embodiments, the adjustment amplitude of the sampling rate may be determined by setting a confidence degree threshold. For example, the confidence degree threshold may include the first confidence threshold, the second confidence threshold, the third confidence threshold, etc. When the confidence degree is higher than the first confidence degree threshold, the adjustment amplitude of the sampling rate is 0.8 times; when the confidence degree is higher than the second confidence degree threshold and less than the first confidence degree threshold, the adjustment range of the sampling rate is 0.9 times; when the confidence is less than the second confidence threshold, the sampling rate is not adjusted.

In some embodiments, the adjustment amplitude of the sampling rate may also be determined by a functional relationship between the confidence degree and the sampling rate. As shown in formula (3):

$$r = ks + e \qquad (3),$$

where, r denotes the adjustment amplitude of the sampling rate, and the value of r denotes in the range of the interval of (0, 1]; s denotes the confidence degree; k and e denotes constants.

Some embodiments of the present disclosure control the amount of the monitoring data by adjusting the sampling rate, which can ensure that while obtaining effective data content, the amount of data can be reduced, the broadband transmission pressure can be reduced, the operation speed of the transmission network platform can be improved, and the data management of the platform can be facilitated.

The basic concepts have been described above. Obviously, for those skilled in the art, the above detailed disclosure is only an example and does not constitute a limitation of the present disclosure. Although it is not explicitly stated here, those skilled in the art may make various modifications, improvements and amendments to the present disclosure. Such modifications, improvements and amendments are suggested in the present disclosure, so such modifications, improvements and amendments still belong to the spirit and scope of the exemplary embodiments of the present disclosure.

Meanwhile, the present disclosure uses specific words to describe the embodiments of the present disclosure. For example, "one embodiment", and/or "some embodiments" mean a certain feature or structure related to at least one embodiment of the present disclosure. Therefore, it should be emphasized and noted that "one embodiment" or "an alternative embodiment" mentioned twice or more in different positions in the present disclosure does not necessarily refer to the same embodiment. In addition, certain features or structures in one or more embodiments of the present disclosure may be appropriately combined.

In addition, unless explicitly stated in the claims, the sequence of processing elements and sequences, the use of numbers and letters, or the use of other names described in the present disclosure are not used to define the sequence of processes and methods in the present disclosure. Although the above disclosure has discussed some currently considered useful embodiments of the invention through various examples, it should be understood that such details are only for the purpose of explanation, and the additional claims are not limited to the disclosed embodiments. On the contrary, the claims are intended to cover all amendments and equivalent combinations that conform to the essence and scope of the embodiments of the present disclosure. For example, although the system components described above can be implemented by hardware devices, they can also be implemented only by software solutions, such as installing the described system on an existing server or mobile device.

Similarly, it should be noted that, in order to simplify the description disclosed in the present disclosure and thus help the understanding of one or more embodiments of the invention, the foregoing description of the embodiments of the present disclosure sometimes incorporates a variety of features into one embodiment, the drawings or the description thereof. However, this disclosure method does not mean that the object of the present disclosure requires more features than those mentioned in the claims. In fact, the features of the embodiments are less than all the features of the single embodiments disclosed above.

In some embodiments, numbers describing the number of components and attributes are used. It should be understood that such numbers used in the description of embodiments are modified by the modifier "about", "approximate" or "generally" in some examples. Unless otherwise stated, "approximately" or "generally" indicate that a ±20% change in the figure is allowed. Accordingly, in some embodiments, the numerical parameters used in the description and claims are approximate values, and the approximate values can be changed according to the characteristics required by individual embodiments. In some embodiments, the numerical parameter should consider the specified significant digits and adopt the method of general digit reservation. Although the numerical fields and parameters used to confirm the range breadth in some embodiments of the present disclosure are approximate values, in specific embodiments, the setting of such values is as accurate as possible within the feasible range.

For each patent, patent application, patent application disclosure and other materials cited in the present disclosure, such as articles, books, specifications, publications, documents, etc., the entire contents are hereby incorporated into the present disclosure for reference. Except for the application history documents that are inconsistent with or conflict with the contents of the present disclosure, and the documents that limit the widest range of claims in the present disclosure (currently or later appended to the present disclosure). It should be noted that in case of any inconsistency or conflict between the description, definitions, and/or use of terms in the supplementary materials of the present disclosure and the contents described in the present disclosure, the description, definitions, and/or use of terms in the present disclosure shall prevail.

Finally, it should be understood that the embodiments described in the present disclosure are only used to illustrate the principles of the embodiments of the present disclosure. Other deformations may also fall within the scope of the present disclosure. Therefore, as an example rather than a limitation, the alternative configuration of the embodiments of the present disclosure can be regarded as consistent with the teachings of the present disclosure. Accordingly, the embodiments of the present disclosure are not limited to those explicitly introduced and described in the present disclosure.

What is claimed is:

1. Industrial Internet of things with a sensor network platform in a front sub platform type, comprising: a terminal device, a first server, a second server, a gateway, and production line devices and device data collectors, wherein the terminal device is configured as a user platform, the first server is configured as a service platform, the second server is configured as a management platform, the gateway is configured as a sensor network platform, and the production line devices and the device data collectors are configured as an object platform which are interacted sequentially, wherein the user platform interacts with a user;
the service platform is configured to:
　receive an instruction of the user platform and send the instruction to the management platform, and
　extract information required for the user platform from the management platform, process the information, and send the information to the user platform;
the management platform is configured to control an operation of the object platform, and receive feedback data of the object platform;
the sensor network platform is configured for interaction between the object platform and the management platform;
wherein
the service platform adopts centralized layout, the management platform adopts independent layout, and the sensor network platform adopts front sub platform layout; wherein
　the centralized layout means that the service platform uniformly receives data, uniformly processes data and uniformly sends data;
　the independent layout means that the management platform adopts different sub platforms for data storage, data processing and/or data transmission for different types of data;
　the front sub platform layout means that the sensor network platform is provided with a general platform and a plurality of sub platforms, the plurality of sub platforms respectively store and process data of different types or data of different receiving objects sent by the object platform, and the general platform stores and processes data of the plurality of sub platforms after summarizing the data of the plurality of sub platforms, and transmits the data after summarization to the management platform;

the production line devices and the device data collectors of the object platform are divided into a plurality of target objects in different process sequences according to processes of manufacturing an assembly line product, and a device data collector of a same target object is used to collect real-time data of a production line device of a corresponding process;

each sub platform of the sensor network platform corresponds to target object data of each of different process sequences, the target object data includes threshold data of a production line device stored in each sub platform database and real-time data collected by a device data collector, each sub platform database is configured in the gateway;

when the real-time data of the production line device is greater than the threshold data, a sub platform corresponding to the production line device retrieves the target object data in a corresponding sub platform database, packages the target object data into packaged data and transmits the packaged data to the general platform of the sensor network platform;

the general platform of the sensor network platform receives the packaged data, generates compiled files sorted according to the different process sequences based on a corresponding production line device and the device data collector, classifies the compiled files according to the different process sequences, and stores them in the second server;

the first server receives or retrieves the compiled files in corresponding process sequences, analyzes the compiled files, and sends different control instructions to a corresponding second server based on analysis results;

the first server sorts and classifies the different control instructions according to the different process sequences of the object platform, and generates classified control instructions corresponding to the different process sequences, the second server generates configuration files of different types corresponding to the different process sequences according to the classified control instructions, and sends the configuration files to the general platform of the sensor network platform for summary and storage; and each sub platform database of the sensor network platform corresponds to each information channel, the general platform of the sensor network platform sends the configuration files to corresponding sub platforms, respectively, and the sub platforms control corresponding production line devices and device data collectors to execute corresponding control instructions according to the configuration files, respectively.

2. The industrial Internet of things with the sensor network platform in the front sub platform type of claim 1, wherein when there are one or more sub processes in a same process, the production line devices and device data collectors corresponding to the one or more sub processes are divided into multiple sub target objects of different sub process sequences according to a sequence of manufacturing the assembly line product, sub target object data of each sub target object includes threshold data and real-time data corresponding to each sub target object, all sub target object data are sorted according to the sequence of manufacturing the assembly line product, packaged and summarized, and used as target object data of the same process.

3. The industrial Internet of things with the sensor network platform in the front sub platform type of claim 1, wherein the threshold data of the production line device includes a fixed parameter value of a maximum threshold allowed by a corresponding production line device during product manufacturing, the real-time data is a real-time parameter value collected by the device data collector of a corresponding production line device according to a predetermined time, and the real-time parameter value and the fixed parameter value belong to a same parameter type.

4. The industrial Internet of things with the sensor network platform in the front sub platform type of claim 3, wherein the threshold data of the production line device includes an early warning parameter value corresponding to an early warning threshold set by the production line device during the product manufacturing, and the early warning parameter value is 70%~90% of the fixed parameter value; and when the real-time parameter value of the device data collector is greater than the early warning parameter value, the sub platform corresponding to the production line device also retrieves the target object data in a corresponding sub platform database and packages the target object data to the general platform of the sensor network platform; and at this time, the target object data includes the early warning parameter value and the real-time parameter value.

5. The industrial Internet of things with the sensor network platform in the front sub platform type of claim 4, wherein when the real-time parameter value is greater than the early warning parameter value and the fixed parameter value, the sub platform corresponding to the production line device takes a corresponding fixed parameter value as priority data, and packages the fixed parameter value and the real-time parameter value as the target object data in priority to the general platform of the sensor network platform.

6. The industrial Internet of things with the sensor network platform in the front sub platform type of claim 1, wherein that the general platform of the sensor network platform receives the packaged data, generates compiled files sorted according to the process sequences based on the corresponding production line device and the device data collector, classifies the compiled files according to the process sequences, and stores them in the second server includes:

storing threshold data tables and real-time data tables sorted according to the process sequences in advance;

receiving the packaged data and compiles the packaged data according to the process sequences, and compiles the threshold data and the real-time data of one particular process of a process sequence into corresponding threshold data tables and real-time data tables to form the compiled files in sequence; wherein the second server is arranged with a plurality of independent sub platform servers according to the process sequences, and the compiled files are stored through independent sub platform servers of corresponding processes, respectively.

7. The industrial Internet of things with the sensor network platform in the front sub platform type of claim 1, wherein to receive or retrieve the compiled files in corresponding process sequences and analyze the compiled files, and send different control instructions to a corresponding second server based on analysis results, the first server is preset with a real area map matching with installation environment of the production line devices, the production line devices in the real area map are named successively according to process sequences of manufacturing the assembly line product, and each production line device has a parameter comparison table, wherein the parameter comparison table at least comprises a standard data column and a comparison data column;

after the first server receives or retrieves the compiled files in the corresponding sequences, the compiled files are divided into sections successively according to the process sequences, and the target object data in the compiled files corresponding to each section is mapped to the parameter comparison table of the production line device of the corresponding process, wherein the threshold data and the real-time data correspond to the standard data column and the comparison data column, respectively;

when the real-time data exceeds the threshold data, the first server associates and identifies a corresponding production line device in the real area map;

the first server sends the different control instructions to different identified production line devices, packages all the different control instructions successively according to the process sequences, and then transmits them to the corresponding second server.

8. The industrial Internet of things with the sensor network platform in the front sub platform type of claim 7, wherein each production line device in the real area map is also configured with a control instruction table, the control instruction table stores a plurality of control instructions and control instruction data packets associated with the control instructions, and when the first server sends control instructions corresponding to different control instruction tables, control instruction data packets of the different control instructions are packaged successively according to the process sequences and transmitted to the corresponding second server.

9. The industrial Internet of things with the sensor network platform in the front sub platform type of claim 8, wherein in the compiled files, data segmentation characters are set between different processes, and the compiled files are segmented into node data through the data segmentation characters, a number of the node data is the same as a number of processes of manufacturing the assembly line product.

10. A control method of industrial Internet of things with a sensor network platform in a front sub platform type, wherein production line devices and device data collectors of object platform are divided into a plurality of target objects in different process sequences according to processes of manufacturing an assembly line product, and a device data collector of a same target object is used to collect real-time data of a production line device of a corresponding process;

each sub platform of the sensor network platform corresponds to target object data of each of different process sequences, the target object data includes threshold data of a production line device stored in each sub platform database and real-time data collected by a device data collector, each sub platform database is configured in a gateway; and the control method comprising:

when the real-time data of the production line device is greater than the threshold data, by the sub platform corresponding to the production line device, retrieving the target object data in a corresponding sub platform database, packaging the target object data into packaged data and transmitting the packaged data to a general platform of the sensor network platform;

by the general platform of the sensor network platform, receiving packaged data, generating compiled files sorted according to the process sequences based on a corresponding production line device and the device data collector, classifying the compiled files according to the process sequences, and storing them in a second server;

by a first server, receives or retrieves the compiled files in corresponding process sequences, analyzes the compiled files, and sends different control instructions to a corresponding second server based on analysis results;

by the first server, sorting and classifying the different control instructions according to the different process sequences of the object platform, and generating classified control instructions corresponding to the different process sequences, by the second server, generating different types of configuration files according to the classified control instructions according to the process sequences, and sending the configuration files to the general platform of the sensor network platform for summary and storage; and sending, by the general platform of the sensor network platform, the configuration files to the corresponding sub platforms, respectively, and controlling, by the sub platforms, the corresponding production line devices and device data collectors to execute the corresponding control instructions according to the configuration files, respectively, wherein each sub platform database of the sensor network platform corresponds to each information channel.

11. The control method of claim 10, wherein target object data of a process includes monitoring data of the process, and the control method further comprises:

predicting an amount of the monitoring data during the production of a production line device collected by a device data collector corresponding to the process, wherein the amount of the monitoring data refers to an amount of data contained in the monitoring data; and determining a broadband distribution scheme of the monitoring data transmitted by a sub platform of the sensor network platform based on the predicted amount of the monitoring data.

12. The control method of claim 11, wherein the predicting an amount of the monitoring data during the production of a production line device collected by a device data collector corresponding to the process comprises:

predicting the amount of the monitoring data based on proficiency of an operator of the production line device corresponding to the process, relevant parameters of the process and shooting parameters of the process.

13. The control method of claim 11, further comprising:

determining whether the amount of the monitoring data is greater than a first threshold; and preprocessing the monitoring data before transmitting the monitoring data in response to the amount of the monitoring data being greater than the first threshold.

14. The control method of claim 11, further comprising:
  determining a sampling rate of the monitoring data based on the predicted amount of the monitoring data.

\* \* \* \* \*